(12) United States Patent
Sarpotdar

(10) Patent No.: US 11,417,925 B2
(45) Date of Patent: Aug. 16, 2022

(54) NOBLE GAS BASED LOW PROFILE SELF-INFLATABLE INSULATION FOR HIGH ALTITUDE APPLICATION OF LI-ION BATTERY PACK

(71) Applicant: Aurora Flight Sciences Corporation, Manassas, VA (US)

(72) Inventor: Shekhar Mahadev Sarpotdar, Bethesda, MD (US)

(73) Assignee: AURORA FLIGHT SCIENCES CORPORATION, Manassas, VA (US)

( * ) Notice: Subject to any disclaimer, the term of this patent is extended or adjusted under 35 U.S.C. 154(b) by 389 days.

(21) Appl. No.: 16/535,001

(22) Filed: Aug. 7, 2019

(65) Prior Publication Data

US 2021/0043884 A1 Feb. 11, 2021

(51) Int. Cl.
*H01M 50/116* (2021.01)
*H01M 50/24* (2021.01)
*H01M 50/138* (2021.01)
*H01M 10/658* (2014.01)

(52) U.S. Cl.
CPC ....... *H01M 50/116* (2021.01); *H01M 50/138* (2021.01); *H01M 50/24* (2021.01); *H01M 10/658* (2015.04); *H01M 2220/20* (2013.01)

(58) Field of Classification Search
CPC ............. H01M 50/105; H01M 50/116; H01M 50/1245; H01M 50/138; H01M 50/136; H01M 50/24; H01M 50/238; H01M 50/242; H01M 50/249; H01M 50/20; H01M 2220/20; H01M 2200/20; H01M 10/658; H01M 10/653; H01M 10/6551; H01M 10/615
See application file for complete search history.

(56) References Cited

U.S. PATENT DOCUMENTS 4,946,415 A * 8/1990 Huang .................. A63H 27/10
446/225

* cited by examiner

*Primary Examiner* — Ula C Ruddock
*Assistant Examiner* — Matthew W Van Oudenaren
(74) *Attorney, Agent, or Firm* — McDonnell Boehnen Hulbert & Berghoff LLP

(57) ABSTRACT

In an example, an insulation apparatus is described. The apparatus includes a battery pack comprising a plurality of battery cells, and an insulating bag disposed around, and attached to, a surface of the battery pack. The insulating bag is configured to expand at an altitude. The insulating bag includes an outer surface, and the outer surface includes a polyethylene terephthalate (PET) film. The insulating bag is at least partially filled with a Noble gas.

20 Claims, 4 Drawing Sheets

ATTACHING THE BATTERY PACK TO A PLATFORM, WHEREIN THE INSULATING BAG IS DISPOSED AROUND THE PLATFORM, WHEREIN THE PLATFORM COMPRISES A PLURALITY OF SUPPORTS, AND WHEREIN THE INSULATING BAG FURTHER COMPRISES A PLURALITY OF HOLES CONFIGURED TO ACCEPT THE PLURALITY OF SUPPORTS OF THE PLATFORM — 508

DISPOSING A LAYER OF INSULATING FOAM AROUND THE INSULATING BAG — 510

NOBLE GAS BASED LOW PROFILE SELF-INFLATABLE INSULATION FOR HIGH ALTITUDE APPLICATION OF LI-ION BATTERY PACK

FIELD

The present disclosure relates generally to the insulation of battery packs, and more particularly, to a system and apparatus for insulating the battery packs, as well as a method of manufacturing the system and apparatus.

BACKGROUND

Battery packs are frequently used to power various components in high-altitude aircrafts. At high altitudes, these battery packs may not function properly due to the cold temperatures, which can reach as low as −90° Celsius (C). Typically, these battery packs are insulated to prevent malfunction and damage.

Existing methods for insulating battery packs at high altitudes implement a layer of insulating foam (i.e., POLYDAMP® Hydrophobic Melamine Foam Ultra-Lite (PHMUL)) disposed around the battery packs. While this offers some insulation, the use of PHMUL insulation alone may not provide enough insulation or may occupy a large volume of the fuselage. For example, in some instances, the PHMUL insulation can be larger than the battery pack for which it is insulating.

What is needed is a system that can effectively insulate battery packs at a high altitude without occupying a large volume of the fuselage.

SUMMARY

In an example, an insulation apparatus is described. The apparatus comprises a battery pack comprising a plurality of battery cells, and an insulating bag disposed around, and attached to, a surface of the battery pack. The insulating bag is configured to expand at an altitude. The insulating bag comprises an outer surface. The outer surface comprises a polyethylene terephthalate (PET) film. The insulating bag is at least partially filled with a Noble gas.

In another example, an insulation system is described. The insulation system comprises a platform. The platform comprises a plurality of supports configured to attach the platform to a fuselage. The insulation system further comprises a battery pack attached to the platform. The battery pack comprises a plurality of battery cells. The insulation system further comprises a battery housing. The battery housing is attached to the platform and surrounds the battery pack. The insulation system further comprises an insulating bag disposed around the battery pack and within the battery housing. The insulating bag is configured to expand at an altitude. The insulating bag comprises an outer surface. The outer surface comprises a polyethylene terephthalate (PET) film. The insulating bag is at least partially filled with a Noble gas. The insulating bag further comprises a plurality of holes configured to accept the plurality of supports of the platform.

In another example, a method of manufacturing an insulating apparatus is described. The method comprises disposing an insulating bag around, and attaching the insulating bag to, a surface of a battery pack. The insulating bag is configured to expand at an altitude. The insulating bag comprises an outer surface. The outer surface comprises a polyethylene terephthalate (PET) film. The insulating bag is at least partially filled with a Noble gas.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, apparatuses and systems for insulating battery packs at high altitude, as well as methods for manufacturing these apparatuses and systems, are described. More specifically, example apparatuses and systems insulate battery packs at high altitude using an insulating bag at least partially filled with a Noble gas.

As previously discussed, a number of battery packs may be used to power the electronic components of an aircraft. The battery packs are arranged along the fuselage (main body) of the aircraft. These battery packs are typically insulated using PHMUL foam. Although PHMUL foam offers adequate thermal resistance, it occupies a large volume of the fuselage. This is typically acceptable when insulating battery packs with a small form factor. However, when larger battery packs are used, such as cylindrical battery cells with 250 Whr/kg or 400 Wh/L energy density, use of the PHMUL foam can cause high energy loss (i.e., greater than 15 kWhr).

To remedy this problem, the example apparatuses and systems provide for an insulating bag that is disposed around a battery pack. The insulating bag is deflated at sea-level and at least partially filled with a Noble gas. When the insulating bag reaches altitude, the Noble gas inside the bag causes the bag to inflate, increasing thermal resistance and keeping the battery pack from becoming too cold and malfunctioning.

The use of the insulating bag may be beneficial as it offers between one third and one sixth the thermal conductivity of PHMUL insulation, allowing for increased insultation with a smaller footprint. This smaller footprint reduces the amount of the fuselage previously dedicated to PHMUL insulation, allowing the fuselage to be used for other purposes such as additional battery packs or other storage.

Since the battery packs are arranged along the fuselage, the use of the insulating bag may further be beneficial as it reduces the total weight of the fuselage and reduces the fuselage cross section area. These reductions may reduce the overall drag of the fuselage associated with the weight and cross section area.

The insulating bag may be disposed partially or completely around the battery pack. The particular configuration depends on the shape of the battery pack, as well as the desired thermal resistance. A number of example configurations of the insulating bag and insulation system are described herein.

Figure 1:
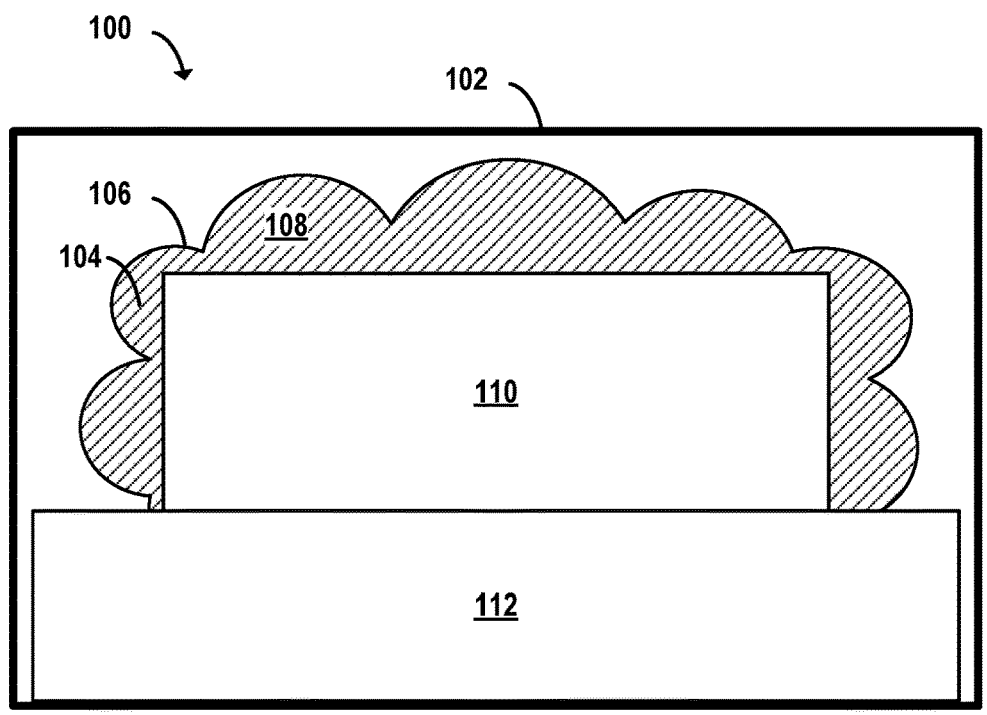
FIG. 1 is an example insulation system shown at sea level, according to an example implementation.

Referring now to the figures, FIG. 1 illustrates an example of an insulation system 100 shown at sea level, according to an example implementation. The insulation system 100 includes a battery housing 102, an insulating bag 104, a battery pack 110, and a platform 112.

The battery housing 102 may include a structure that is attached to a fuselage of an aircraft. The battery housing 102 may be formed out of plastic or metal and may be configured to contain the insulating bag 104, the battery pack 110, and the platform 112.

The insulating bag 104 may include an outer surface 106 formed of a thermoplastic polymer. In some examples, the outer surface 106 of insulating bag 104 is formed of a polyethylene terephthalate (PET) film. The use of PET film is beneficial as it has high tensile strength, chemical and dimensional stability, transparency, reflectivity, gas and aroma barrier properties, and electrical insulation. In some embodiments, the outer surface 106 of insulating bag 104 may be formed of a biaxially-oriented polyethylene terephthalate (BoPET) film. Other examples of polyester films and thermoplastic polymers may be used.

The PET film may be between 0.05 mm and 0.5 mm, depending on the application. Further, the PET film may be coated in aluminum on both sides. The coating of aluminum may be achieved by vapor depositing the aluminum on both sides of the PET film. The aluminum coating may be between 0.005 mm and 0.05 mm, depending on the application. The aluminum has an emissivity of between 0.02 and 0.07, which further reduces any heat leakage due to radiation. The aluminum coating also reduces the permeability of the PET film, which in turn slows any leakage of gas through the PET film. Additionally, the aluminum coating reduces the thermal radiation heat transfer between the atmosphere and the battery pack 110.

The outer surface 106 of the insulating bag 104 may be disposed around, and attached to, the battery pack 110. In some examples, the outer surface 106 of the insulating bag 104 may cover the battery pack 110, making contact with the battery pack 110 only at locations at which the outer surface 106 is attached to the battery pack 110 via an adhesive. The locations at which the outer surface 106 is attached to the battery pack 110 may include the location at which the battery pack 110 is attached to the platform 112 or at a number of periodic locations on the battery pack 110 suitable to secure the outer surface 106 to the battery pack 110. In other examples, the outer surface 106 may cover the battery pack 110 but not make contact to the battery pack 110. In these examples, the outer surface 106 may be attached to the platform 112 via an adhesive.

The insulating bag 104 may at least be partially filled with a Noble gas 108, such as Helium (He), Neon (Ne), Argon (Ar), Krypton (Kr), Xenon (Xe), Radon (Rn), or Oganesson (Og). At least partially filing the insulating bag 104 with the Noble gas 108 may include filling the insulating bag 104 with the Noble gas 108 to between 5% and 50% of the total volume of the insulating bag 104. At least partially filling the insulating bag 104 with the Noble gas 108 may be beneficial as it increases the thermal resistance and reduces the natural convection that occurs in spaces involving heat transfer. Buoyancy and viscosity are two forces involved in the creation of natural convection. When the buoyancy force overcomes the viscous force, natural convection occurs. Natural convection is undesirable as natural convection eliminates the benefit of insulation. Natural convection typically occurs at a Rayleigh number (Ra) of above about 1700 for horizontal spaces, and 1000 for vertical spaces. The following table illustrates the thermal properties of a vertical orientation of a battery pack 110 implementing the insulating bag 104 partially filled with Krypton.

| Altitude [kft] | Ambient Pressure [Pa] | Volume | T [K] | K [W/m/K] | $Ra_{Critical}$ | $L_{Critical}$ [cm] | $L_{minimum}$ [cm] |
|---|---|---|---|---|---|---|---|
| 0 | 101325 | 17% | 298 | 0.0094 | 1000 | 0.6 | 2.5 |
| 60 | 11589 | 100% | 195 | 0.0094 | 1000 | 0.8 | 2.5 |
| 85 | 4696 | 100% | 195 | 0.0094 | 1000 | 1.46 | 2.5 |

The measurements shown in the table include (i) altitude, given in thousands of feet, (ii) ambient pressure, given in Pascals, (iii) volume, given in a percentage of maximum volume of the insulating bag 104, (iv) temperature, given in Kelvin, (v) thermal conductivity, given in watts per meter kelvin, (vi) critical Rayleigh number, which represents the Rayleigh number at which natural convection occurs, (vii) the critical distance between a hot and cold surface to maintain stratification, given in centimeters, (viii) and the distance at which stratified Krypton offers the same thermal resistance as 8 cm of PHMUL, given in centimeters.

The above table illustrates that at sea level, the insulating bag 104 need only be filled with Krypton to about 17% of its maximum volume in order to achieve full expansion at 60,000 feet without inducing any stress in the insulating bag 104. For altitudes above 60,000 feet, further gas expansion is prevented by the PET film on the outer surface 106 of the insulating bag 104. While this gas expansion at higher altitudes may cause gauge pressure inside the insulating bag 104, it is not enough pressure to damage the insulating bag 104. Also shown in the table, the thermal conductivity of Krypton at 0° Celsius (C), which is about 0.0094 W/m/K. This thermal conductivity of Krypton is around 30% less than the 0.031 W/m/K thermal conductivity of PHMUL insulation. The lower thermal conductivity of Krypton, combined with the smaller amount of material required to achieve similar thermal resistance, makes the insulating bag 104 filled with Krypton an effective substitute for existing PHMUL insulation. While some embodiments of the insulating bag 104 are described as being filled with Krypton, an alternative Noble gas 108 may be used with different sizes and shapes of insulating bag 104.

The battery pack 110 may include one or more battery subpacks that comprise multiple cells. The battery pack 110 may include lithium-ion batteries as well as batteries with other chemical properties. The battery pack 110 may have a topology that is compatible with the insulating bag 104 (i.e., rectangular, cylindrical, etc.). Any type of battery may be used as the battery pack 110 as long as the topology is compatible with the battery housing 102, the insulating bag 104 and the platform 112.

The platform 112 may include a metal or foam platform configured to connect the battery pack 110 to the fuselage. In some embodiments, the platform 112 is a ROHACELL® platform. The battery pack 110 may be attached to the platform 112 through an adhesive or other attachment apparatus, such as a docking mechanism, fasteners, or equivalent.

Figure 2:
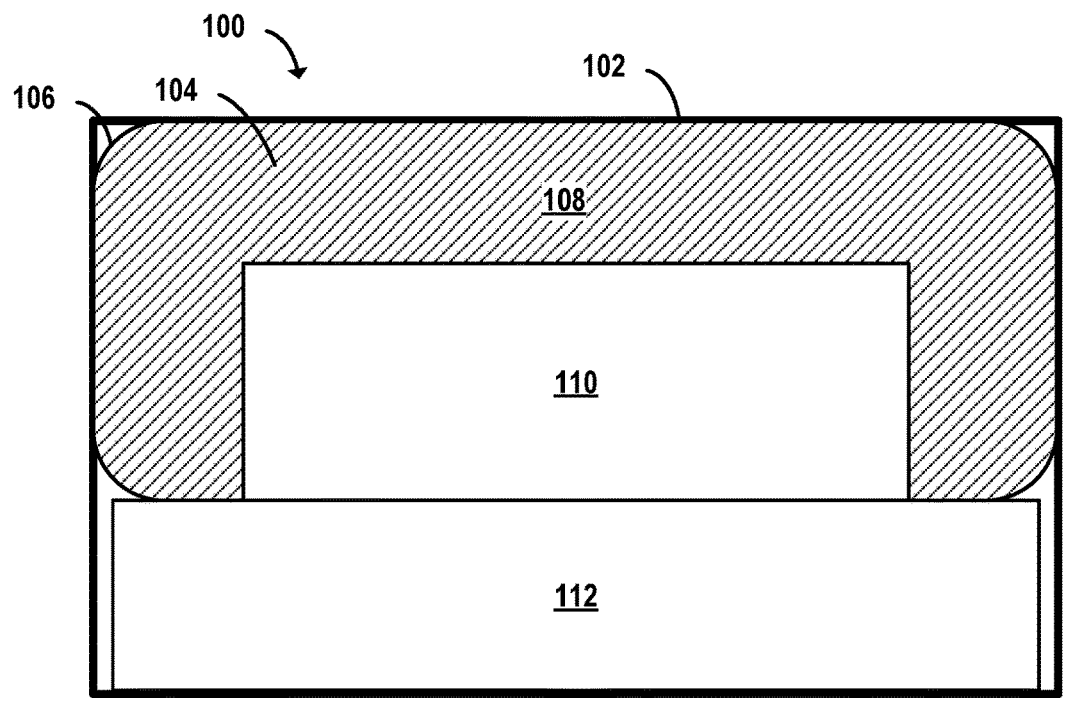
FIG. 2 is an example insulation system shown at altitude, according to an example implementation.

In operation, as shown in FIG. 1, the insulation system 100 is at sea level. At this altitude, the insulating bag 104 is attached to the battery pack 110 and is in a deflated state. As shown in FIG. 2, when insulation system 100 rises to a higher altitude, the insulating bag 104 may inflate.

FIG. 2 is an example insulation system 100 shown at altitude, according to an example implementation. As shown, insulation system 100 includes the battery housing 102, insulating bag 104, battery pack 110, and platform 112 as shown in FIG. 1, but at an altitude of about 60,000 feet.

As shown, the insulating bag 104 is in an expanded state. This is due to the Noble gas 108 inside the space of the insulating bag 104 expanding in response to the lower ambient pressure. As the insulating bag 104 expands, it secures itself to the battery housing 102 through its internal pressure pushing against the battery housing 102. The insulating bag 104 may retain this structure as the insulation system 100 reaches a higher altitude. As the altitude increases to around 85,000 feet, the pressure inside of the insulating bag 104 may increase. However, this pressure is only around 1 pound per square inch (PSI), which is not enough pressure to cause damage to the insulating bag 104.

While the embodiments described with respect to FIGS. 1 and 2 above provide for increased thermal insulation of the battery pack 110 over typical PHMUL insulation, additional configurations of the insulation system 100 may provide more effective thermal insulation. One of these example embodiments is shown in FIG. 3.

Figure 3:
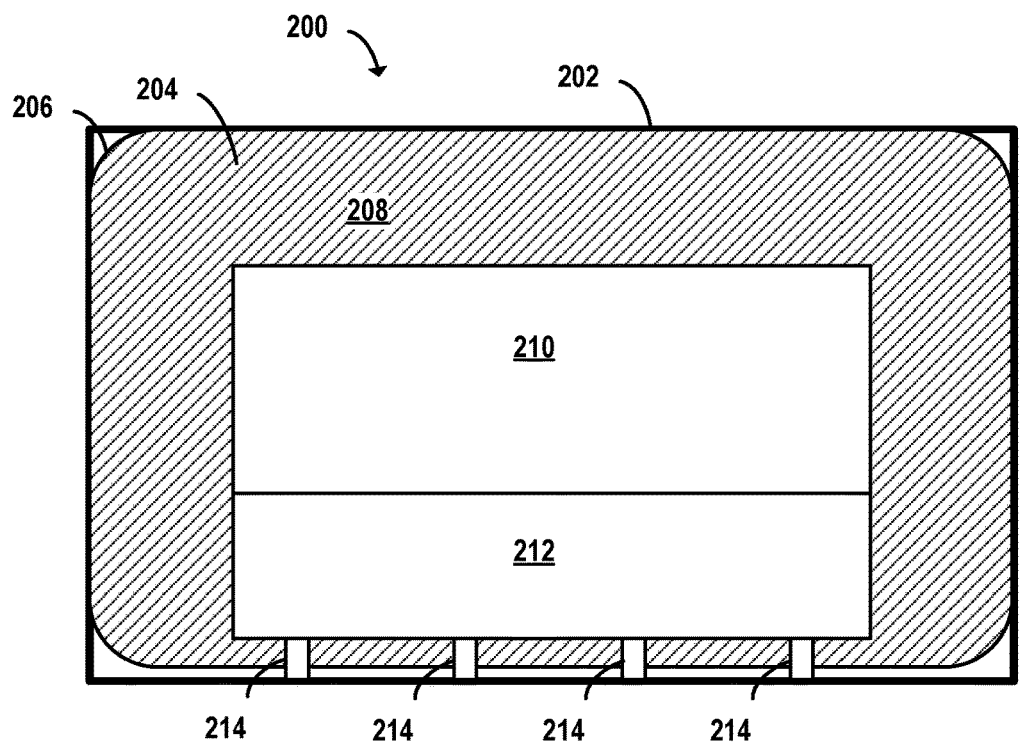
FIG. 3 is an example insulation system shown at altitude, according to an example implementation.

FIG. 3 illustrates an example of an insulation system 200 shown at altitude, according to an example implementation. The insulation system 200 includes the same components as the insulation system 100 shown in FIGS. 1 and 2, but in a modified configuration. The insulation system 200 includes a battery housing 202, insulating bag 204, battery pack 210, platform 212, and a plurality of supports 214.

The battery housing 202 and battery pack 210 are similar to the battery housing 102 and the battery pack 110 shown in FIGS. 1 and 2, although the battery housing 202 and the battery pack 210 may be configured differently to accommodate the insulating bag 204 and platform 212.

The insulating bag 204 has an outer surface 206 made of a PET film that is treated with aluminum, and is at least partially filled with a Noble gas 208 as the insulating bag 104 described in FIGS. 1 and 2. As shown in FIG. 3, the insulating bag 204 is disposed around the battery pack 210 and the platform 212. Further, the insulating bag 204 includes a plurality of holes configured to accept the plurality of supports 214 of the platform 212. As shown in FIG. 3, the outer surface 206 does not come into contact with the battery pack 210, which provides more effective insulation of the battery pack 210. Further, the only places in which the outer surface 206 of the insulating bag 204 comes into contact with the platform 212112 is where the plurality of supports 214 pass through the plurality of holes of the insulating bag 204. This is beneficial as it reduces heat leakage caused by any heat conduction along the outer surface 206 of the insulating bag 204. The plurality of holes of the insulating bag 204 may be attached to the plurality of supports 214 via an adhesive or heat-based sealing.

The platform 212 may be spaced away from the battery housing 202 by the plurality of supports 214. This may be beneficial as it allows the insulating bag 204 to be disposed around the battery pack 210 and the majority of the platform 212 to provide more effective insulation as discussed above.

The plurality of supports 214 may include rods and/or stubs that are configured to allow the platform 212 to be attached to, and rest on, the fuselage.

The insulating bag 104 as described in FIG. 1 and the insulating bag 204 as described in FIG. 2 may be partially filled with a Noble gas 208 to provide insulation to the battery pack 110 and the battery pack 210. However, natural convection may occur when the distance between a side of the battery pack 210 and the outer surface 206 of the insulating bag 204 is too large. To remedy this, partitions can be added to the insulating bag 204.

Figure 4:
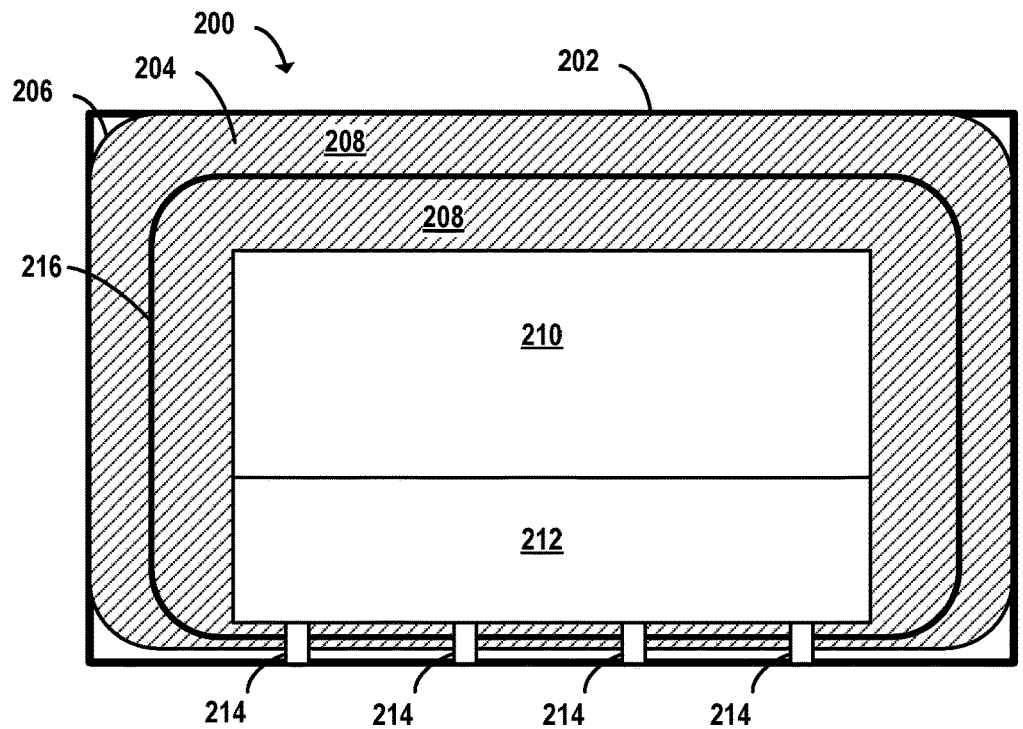
FIG. 4 is an example insulation system shown at altitude, according to an example implementation.

FIG. 4 is an example insulation system 200 shown at altitude, according to an example implementation. The insulation system 200 shown in FIGS. 3 and 4 are the same, except that insulating bag 204 includes an inner wall 216 disposed between the outer surface 206 of the insulating bag 204 and the battery pack 210.

The inner wall 216 may include a layer of PET film treated with aluminum, similar to the outer surface 206 of the insulating bag 204. Although not shown in the cross-sectional view depicted in FIG. 4, the inner wall 216 may be installed via an adhesive or heat sealing to the outer surface 206 at various points to divide the insulating bag 204. The inner wall 216 may define a partition within the insulating bag 204 that also may be partially filled with a Noble gas 208. The inner wall 216 may assist in preventing natural convection by reducing the distance between the outer surface 206 of the insulating bag 204 and the surface of the battery pack 210. For example, without the inner wall 216, the distance between the outer surface 206 of the insulating bag 204 and the battery pack 210 may be 2.5 cm. However, the critical distance that allows for natural convection may be as low as 0.6 cm. The addition of the inner wall 216 remedies this potential issue by reducing the distance between the outer surface 206 of the insulating bag 204 and the battery pack 210. That is, the critical distance is then effectively between the outer surface 206 of the insulating bag 204 and the inner wall 216, instead of the outer surface 206 of the insulating bag 204 and the battery pack 210.

In some embodiments, there may be multiple inner walls 216. The multiple inner walls 216 may be installed via an adhesive or heat sealing to the outer surface 206 at various points to divide the insulating bag 204. The number of inner walls 216 needed for a particular application depends on the topology of the battery pack 210, the size of the insulating bag 204, and the Noble gas 208 at least partially filling the space inside the insulating bag 204. For example, as shown in FIG. 4, only one inner wall 216 is needed to prevent natural convection in the space of the insulating bag 204. However, if Krypton gas is used to partially fill the insulating bag 204, the insulating bag 204 may need two or three inner walls 216 to prevent natural convection.

In some embodiments, an additional layer of insulating foam, such as PHMUL foam, may be disposed around the insulating bag 204. Although not shown, the layer of insulating foam may be adhered to the battery housing 202 or to the insulating bag 204 to provide additional thermal resistance.

Figure 5:
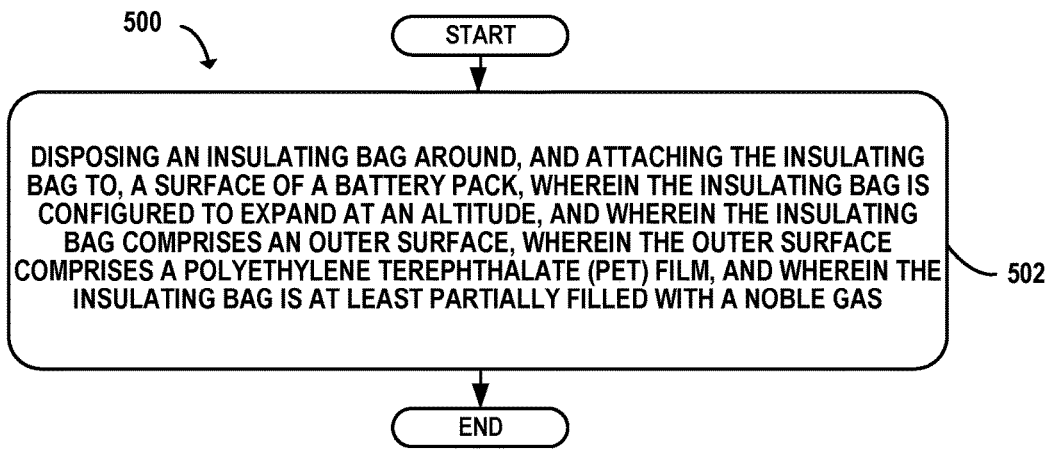
FIG. 5 shows a flowchart of an example method of manufacturing an insulation system, according to an example implementation.

FIG. 5 shows a flowchart of an example method of manufacturing an insulation system, according to an example implementation. Method 500 shown in FIG. 5 presents an example of a method that could be used to manufacture the insulation system 100 shown in FIG. 1 or the insulation system 200 shown in FIG. 2. Further, any type of manufacturing equipment may be used or configured to carry out the steps presented in FIG. 5. In some instances, components of the manufacturing equipment may be configured to perform the functions such that the components are actually configured and structured (with hardware and/or software) to enable such performance. In other examples, components of the manufacturing equipment may be arranged to be adapted to, capable of, or suited for performing the functions, such as when operated in a specific manner. Method 500 may include one or more operations, functions, or actions as illustrated by blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 502, the method 500 includes disposing an insulating bag around, and attaching the insulating bag to, a surface of a battery pack, wherein the insulating bag is configured to expand at an altitude, and wherein the insulating bag comprises an outer surface, wherein the outer surface comprises a polyethylene terephthalate (PET) film, and wherein the insulating bag is at least partially filled with a Noble gas.

Figure 6:
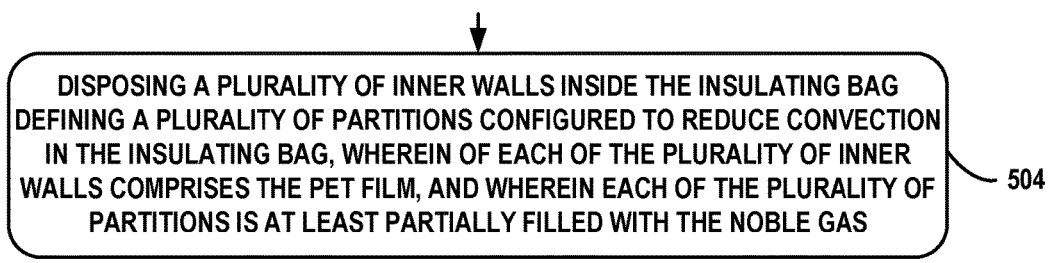
FIG. 6 shows a flowchart of an example method for use with the method shown in FIG. 5, according to an example implementation.

FIG. 6 shows a flowchart of an example method for use with the method 500, according to an example implementation. At block 504, functions include disposing a plurality of inner walls inside the insulating bag defining a plurality of partitions configured to reduce convection in the insulating bag, wherein of each of the plurality of inner walls comprises the PET film, and wherein each of the plurality of partitions is at least partially filled with the Noble gas.

Figure 7:
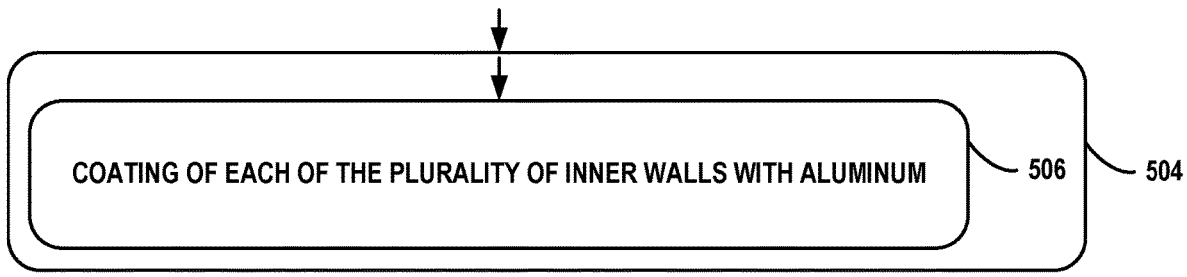
FIG. 7 shows a flowchart of an example method for use with the method shown in FIG. 5, according to an example implementation.

FIG. 7 shows a flowchart of an example method for performing the applying as shown in block 504, according to an example implementation. At block 506, functions include coating of each of the plurality of inner walls with aluminum.

Figure 8:
FIG. 8 shows a flowchart of an example method for use with the method shown in FIG. 5, according to an example implementation.

FIG. 8 shows a flowchart of an example method for use with the method 500, according to an example implementation. At block 508, functions include attaching the battery pack to a platform, wherein the insulating bag is disposed around the platform, wherein the platform comprises a plurality of supports, and wherein the insulating bag further comprises a plurality of holes configured to accept the plurality of supports of the platform.

Figure 9:
FIG. 9 shows a flowchart of an example method for use with the method shown in FIG. 5, according to an example implementation.

FIG. 9 shows a flowchart of an example method for use with the method 500, according to an example implementation. At block 510, functions include disposing a layer of insulating foam around the insulating bag.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An insulation apparatus comprising:
a battery pack comprising a plurality of battery cells;
a battery housing that contains the battery pack; and
an insulating bag disposed over the battery pack, wherein the insulating bag is configured to expand within the battery housing in response to an increase in altitude, wherein the insulating bag comprises an outer surface, wherein the outer surface comprises a polyethylene terephthalate (PET) film, and wherein the insulating bag is at least partially filled with a Noble gas.

2. An insulation apparatus comprising:
a battery pack comprising a plurality of battery cells; and
an insulating bag disposed over the battery pack, wherein the insulating bag is configured to expand at an altitude, wherein the insulating bag comprises an outer surface, wherein the outer surface comprises a polyethylene terephthalate (PET) film, and wherein the insulating bag is at least partially filled with a Noble gas,
wherein the insulating bag comprises a plurality of inner walls defining a plurality of partitions configured to reduce convection in the insulating bag, wherein each of the plurality of inner walls comprises the PET film, and wherein each of the plurality of partitions is at least partially filled with the Noble gas.

3. The insulation apparatus according to claim 2, wherein each of the plurality of inner walls are coated in aluminum.

4. The insulation apparatus according to claim 1, wherein the PET film comprises a biaxially oriented polyethylene terephthalate (BoPET) film.

5. An insulation apparatus comprising:
a battery pack comprising a plurality of battery cells;
an insulating bag disposed over the battery pack, wherein the insulating bag is configured to expand at an altitude, wherein the insulating bag comprises an outer surface, wherein the outer surface comprises a polyethylene terephthalate (PET) film, and wherein the insulating bag is at least partially filled with a Noble gas; and
a platform, wherein the platform comprises a plurality of supports, wherein the insulating bag is disposed around the platform, and wherein the insulating bag further comprises a plurality of holes configured to accept the plurality of supports of the platform.

6. An insulation apparatus comprising:
a battery pack comprising a plurality of battery cells;
an insulating bag disposed over the battery pack, wherein the insulating bag is configured to expand at an altitude, wherein the insulating bag comprises an outer surface, wherein the outer surface comprises a polyethylene terephthalate (PET) film, and wherein the insulating bag is at least partially filled with a Noble gas; and
a layer of insulating foam disposed around the insulating bag.

7. An insulation apparatus comprising:
a battery pack comprising a plurality of battery cells; and
an insulating bag disposed over the battery pack, wherein the insulating bag is configured to expand at an altitude, wherein the insulating bag comprises an outer surface, wherein the outer surface comprises a polyethylene terephthalate (PET) film, and wherein the insulating bag is at least partially filled with a Noble gas,
wherein the Noble gas comprises Krypton, Xenon, or Argon.

8. An insulation system comprising:
a platform, wherein the platform comprises a plurality of supports configured to attach the platform to a fuselage;
a battery pack attached to the platform, wherein the battery pack comprises a plurality of battery cells;
a battery housing, wherein the battery housing is attached to the platform and contains the battery pack; and
an insulating bag disposed over the battery pack and within the battery housing, wherein the insulating bag is configured to expand within the battery housing in response to an increase in altitude, wherein the insulating bag comprises:
an outer surface, wherein the outer surface comprises a polyethylene terephthalate (PET) film, and wherein the insulating bag is at least partially filled with a Noble gas; and
a plurality of holes configured to accept the plurality of supports of the platform.

9. The insulation system according to claim 8, wherein the insulating bag comprises a plurality of inner walls defining a plurality of partitions configured to reduce convection in the insulating bag, wherein each of the plurality of inner walls comprise the PET film, and wherein each of the plurality of partitions is at least partially filled with the Noble gas.

10. The insulation system according to claim 9, wherein each of the plurality of inner walls are coated in aluminum.

11. The insulation system according to claim 8, wherein the PET film comprises a biaxially oriented polyethylene terephthalate (BoPET) film.

12. The insulation system according to claim 8, further comprising a layer of insulating foam disposed between the insulating bag and the battery housing.

13. The insulation system according to claim 8, wherein the Noble gas comprises Krypton, Xenon, or Argon.

14. The insulation system according to claim 8, wherein the insulating bag is configured to secure itself to the battery housing when the insulating bag is expanded.

15. A method of manufacturing an insulation apparatus comprising:
disposing an insulating bag over a battery pack comprising a plurality of battery cells contained by a battery housing, wherein the insulating bag is configured to expand within the battery housing in response to an increase in altitude, wherein the insulating bag comprises an outer surface, wherein the outer surface comprises a polyethylene terephthalate (PET) film, and wherein the insulating bag is at least partially filled with a Noble gas.

16. A method of manufacturing an insulation apparatus comprising:
disposing an insulating bag over a battery pack comprising a plurality of battery cells, wherein the insulating bag is configured to expand at an altitude, wherein the insulating bag comprises an outer surface, wherein the outer surface comprises a polyethylene terephthalate (PET) film, and wherein the insulating bag is at least partially filled with a Noble gas; and
disposing a plurality of inner walls inside the insulating bag defining a plurality of partitions configured to reduce convection in the insulating bag, wherein of each of the plurality of inner walls comprises the PET film, and wherein each of the plurality of partitions is at least partially filled with the Noble gas.

17. The method of claim 16, further comprising coating of each of the plurality of inner walls with aluminum.

18. A method of manufacturing an insulation apparatus comprising:
disposing an insulating bag over a battery pack comprising a plurality of battery cells, wherein the insulating bag is configured to expand at an altitude, wherein the insulating bag comprises an outer surface, wherein the outer surface comprises a polyethylene terephthalate (PET) film, and wherein the insulating bag is at least partially filled with a Noble gas; and
attaching the battery pack to a platform, wherein the insulating bag is disposed around the platform, wherein the platform comprises a plurality of supports, and wherein the insulating bag further comprises a plurality of holes configured to accept the plurality of supports of the platform.

19. A method of manufacturing an insulation apparatus comprising:
disposing an insulating bag over a battery pack comprising a plurality of battery cells, wherein the insulating bag is configured to expand at an altitude, wherein the insulating bag comprises an outer surface, wherein the outer surface comprises a polyethylene terephthalate (PET) film, and wherein the insulating bag is at least partially filled with a Noble gas; and
disposing a layer of insulating foam around the insulating bag.

20. A method of manufacturing an insulation apparatus comprising:
disposing an insulating bag over a battery pack comprising a plurality of battery cells, wherein the insulating bag is configured to expand at an altitude, wherein the insulating bag comprises an outer surface, wherein the outer surface comprises a polyethylene terephthalate (PET) film, and wherein the insulating bag is at least partially filled with a Noble gas, wherein the Noble gas comprises Krypton, Xenon, or Argon.

\* \* \* \* \*